Patented Oct. 14, 1952

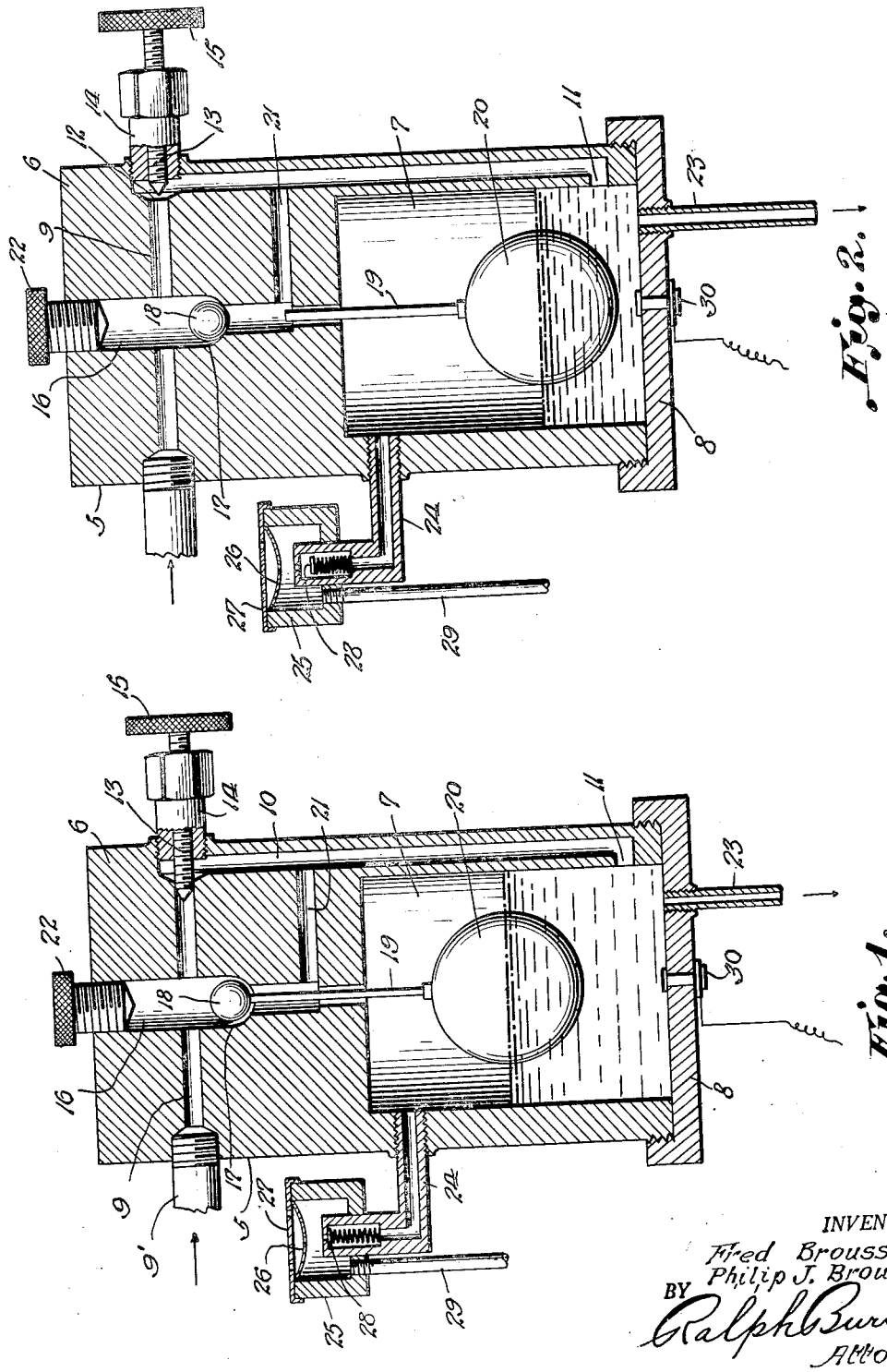

2,614,003

UNITED STATES PATENT OFFICE 2,614,003

SAFETY VALVE FOR FLUID PRESSURE SYSTEMS

Fred Brousseau, Schenectady, and Philip J. Brousseau, Peasleeville, N. Y.

Application March 13, 1947, Serial No. 734,322

1 Claim. (Cl. 303—84)

This invention relates to a safety valve for liquid pressure systems of the pulsating type, for example, hydraulic brake systems for automobiles.

It is an object of the invention to provide a valve which will automatically shut-off the flow of the liquid medium from the master cylinder should a leak occur in a line leading to one of the braking units thereby permitting the remaining braking units to continue to operate.

A further object of the invention resides in providing a safety valve having means to accelerate the closing of the valve when a leak occurs in a line so there will be a minimum loss of liquid from the system.

A still further object of the invention resides in providing means for refilling the broken line with liquid when the leak has been repaired whereby the valve is opened and the line is restored to full operative condition.

Another object of the invention resides in providing a device of the above-mentioned character which is simple and durable in construction, efficient and reliable in operation and inexpensive to manufacture.

Other objects and advantages of the invention will be apparent during the course of the following description.

In the accompanying drawing forming a part of this specification and in which like numerals are employed to designate like parts throughout the same, Fig. 1 is a sectional view of the safety valve in open position, and, Fig. 2 is a similar view of the valve in closed position.

In the drawing wherein for the purpose of illustration a preferred embodiment of the invention is shown the numeral 5 denotes generally the body of the safety valve which consists of a block 6 of circular shape in cross section having a chamber 7 formed in its lower half closed by a screw cap 8 threaded on the body. A transverse passage 9 extends through the upper half of the block, one end of the passage being connected to a line 9' leading to the master cylinder of the fluid pressure system and its opposite end opening into the upper end of a vertical passage 10 communicating at its lower end with the chamber 7, as at 11. The passage 9 at its jointure with the passage 10 has a valve seat 12 for co-action with a needle valve 13 threaded in a bushing 14 mounted in the side of the block. The needle valve is moved towards and from the valve seat by turning the hand wheel 15 whereby the flow of fluid between the passages 9 and 10 may be controlled. A central vertical passage 16 extends through the block and intersects the transverse passage 9 with its lower end communicating with the chamber 7. The bore of the passage 16 is reduced at a point below the transverse passage 9 to provide a valve seat 17 for the ball valve 18 which is freely movable in the upper end of the bore. The bore is further reduced at its lower end to provide a guideway for a valve actuating rod 19 which is mounted to reciprocate therein, the rod being connected at its lower end to a ball float 20 disposed in the chamber 7. The passage 16 below the valve seat 17 has communication with the passage 10 through a branch passage 21. A screw plug 22 closes the upper end of the passage 16. The cap 8 has a discharge opening for connection with the line 23 leading to the braking unit not shown.

An L-shape pipe line 24 extends from the side of the body and has communication with the upper end of the chamber 7. The outer end of the pipe line 24 communicates with an air chamber 25 closed by apertured disks 26 and 27. The pipe line 24 is normally closed by a spring seated disk valve 28 adapted to be opened when a suction is created in the pipe line by the flow of liquid from the chamber 7 thereby admitting air into the chamber to accelerate the flow of liquid therefrom. A pipe 29 leads from the air chamber 25 to the master cylinder to drain any fluid from the chamber that may be deposited therein.

To indicate to the driver when the flow of liquid to one of the braking units has been shut-off an electric signal may be provided having its circuit connected with a contact 30 mounted in the cap 8 beneath the ball float of the chamber 7 the float drops to the bottom of the chamber 7 it will engage the contact 30 and close the circuit to the signal.

In operation, the safety valve is interposed in each of the lines leading from the master cylinder to the braking units. When the system is in full operation the chamber 7 is filled with liquid which raises the ball float 20 and valve actuating rod 19 attached thereto. Upward movement of the rod 19 unseats ball valve 18 allowing liquid under pressure to pass from passage 9, through passage 16 and branch passage 21 into passage 10 communicating with the chamber 7. From the chamber 7 the liquid is discharged into the line 23 leading to the braking unit. If a leak develops in the line to the braking unit, the liquid will be drained from the chamber 7 and the float ball 20 and rod 19 is lowered thereby permitting the ball valve 18 to be seated by the pressure of liquid in passage 16 to shut-off the flow of liquid to the chamber 7. As the liquid drains from the chamber a suction is created in pipe line 24 which opens valve 23 to admit air into the chamber 7 to accelerate the flow of liquid from the chamber. To refill the line with liquid medium after the break has been repaired the needle valve 13 is opened to permit liquid in the passage 9 to enter passage 10 and thus by-pass the ball valve 18. As the level of the liquid in chamber 7 rises the float ball and rod 19 are raised to unseat the ball valve 18 and allow the liquid to pass through passage 16 and branch passage 21 into passage 10. When the system is restored to normal operation the needle valve 13 is closed. While the device has been described in association with a hydraulic brake system for automobiles it is obvious the same may be utilized in fluid pressure systems employed for other purposes.

It is to be understood that the form of invention herein shown and described is to be taken as a preferred example of the same and that certain changes in the shape, size and arrangement of the parts may be made within the spirit of the invention and scope of the subjoined claim.

Having thus described our invention, we claim:

A safety valve for liquid pressure systems of the pulsating type comprising a body having a liquid chamber therein, a vertical passage in said body above said chamber, a ball valve mounted in said vertical passage, a valve actuating rod movable in said passage and extending into said chamber, a float connected to said rod adapted to reciprocate the rod to control the ball valve, a transverse passage through said body intersecting said vertical passage above said ball valve, said transverse passage having one end connected to the source of liquid supply, a longitudinal passage through said body connected at one end to said transverse passage and at its opposite end to the lower end of said liquid chamber, means for controlling the flow of liquid from said transverse passage into said longitudinal passage, and a branch passage establishing communication between the longitudinal passage and said vertical passage below the ball valve.

FRED BROUSSEAU.
PHILIP J. BROUSSEAU.

REFERENCES CITED

The following references are of record in the file of this patent:

UNITED STATES PATENTS

| Number | Name | Date |
| --- | --- | --- |
| 1,922,252 | Martini | Aug. 15, 1933 |
| 2,008,393 | Hess | July 16, 1935 |
| 2,085,628 | Brannan | June 29, 1937 |
| 2,169,462 | Grace | Aug. 15, 1939 |
| 2,410,202 | Crawford | Oct. 29, 1946 |